3,079,385
NOVEL PROCESS OF PREPARATION OF POLY-HYDROXYLATED PREGNANES
Daniel Bertin, Montrouge, and Lucien Nedelec, Clichy-sous-Bois, France, assignors to Roussel-UCLAF, Paris, France, a corporation of France
No Drawing. Filed Jan. 23, 1962, Ser. No. 172,039
Claims priority, application France Jan. 24, 1961
22 Claims. (Cl. 260—239.55)

The invention relates to a novel process for the preparation of 20-bis-(hydroxymethyl)-pregnanes having the formula

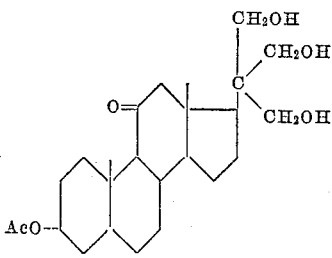

wherein Ac is the acyl radical of a lower aliphatic carboxylic acid having 2 to 7 carbon atoms. The invention also relates to novel intermediates for the compounds of Formula I.

The 20-bis-(hydroxymethyl)-pregnanes of Formula I possess a coronary dilatatory activity as more fully described in the copending, commonly-assigned United States patent application Serial No. 116,976, filed June 14, 1961, now abandoned.

It is an object of the invention to provide a novel process for the preparation of 20-bis-(hydroxymethyl)-pregnanes of Formula I.

It is another object to provide novel intermediates for the preparation of 20-bis-(hydroxymethyl)-pregnanes of Formula I.

These and other objects and advantages of the invention will become obvious from the following detailed description.

The process of the invention comprises condensing 3α-acyloxy-5β-androstane-11,17-dione wherein the acyl group is derived from a lower aliphatic carboxylic acid having 2 to 7 carbon atoms with a lower alkyl cyanoacetate to form the lower alkyl ester of 3α-acyloxy-20-cyano-$\Delta^{17(20)}$-5β-pregnene-11-one-21-oic acid, where acyl represents the acyl radical of said lower aliphatic carboxylic acid, catalytically hydrogenating the latter to form the lower alkyl ester of 3α-acyloxy-20-cyano-5β-pregnane-11-one-21-oic acid, where acyl represents the acyl radical of said lower aliphatic carboxylic acid, simultaneously saponifying and hydrolyzing the latter under alkaline conditions to form 20-carboxy-5β-pregnane-3α-ol-11-one-21-oic acid, esterifying the latter with a lower alkanol in the presence of a dehydrating agent to form the di-lower alkyl ester of 20-carboxy-5β-pregnane-3α-ol-11-one-21 oic acid, reacting the latter with an oxacyclic compound containing a double bond in the α-position to the oxygen atom such as 2,3-dihydropyran, to form in this latter case the di-lower alkyl ester of 3α-[2'-tetrahydropyranyloxy]-20-carboxy-5β-pregnane-11-one-21-oic acid, condensing the latter in the form of an alkali metal derivative with benzyloxy chloromethane to form the di-lower alkyl ester of 3α-[2'-tetrahydropyranyloxy]-20-carboxy-20-benzyloxymethyl-5β-pregnane-11-one-21-oic acid, hydrolyzing the latter under acid conditions to form the di-lower alkyl ester of 20-carboxy-20-benzyloxymethyl-5β-pregnane-3α-ol-11-one-21-oic acid, reducing the latter with a mixed hydride such as lithium aluminum hydride to form 20-hydroxymethyl-20-benzyloxymethyl-5β-pregnane-3α,11β,21-triol, subjecting the latter to catalytic hydrogenolysis to form 20-bis-(hydroxymethyl)-5β-pregnane-3α,11β,21-triol, esterifying the latter with a lower aliphatic carboxylic acid having from 2 to 7 carbon atoms or a functional derivative thereof to form 3α,21-diacyloxy-20-bis-(acyloxymethyl)-5β-pregnane-11β-ol, wherein acyl represents the acyl radical of said lower aliphatic carboxylic acid, oxidizing the latter with a sulfochromic agent to form 3α,21-diacyloxy-20-bis-(acyloxymethyl)-5β-pregnane-11-one, wherein acyl represents the acyl radical of said lower aliphatic carboxylic acid, saponifying the latter under alkaline conditions to form 20-bis-(hydroxymethyl)-5β-pregnane-3α,21-diol-11-one, reacting the latter with a lower alkyl ortho lower aliphatic acylate to form a 1'-(5β-androstane-3α-ol-11-one-17β-yl)-3',5',8'-trioxabicyclo-[2,2,2]-octane compound, esterifying the latter with a lower aliphatic carboxylic acid having from 2 to 7 carbon atoms or a functional derivative thereof to form the corresponding 3α-acyloxy derivative, hydrolyzing the latter under acidic conditions to form 3α-acyloxy - 20 - bis-(hydroxymethyl)-5β-pregnane-21-ol-11-one, wherein acyl represents the acyl radical of said lower aliphatic carboxylic acid, and recoverying the latter.

A preferred embodiment for the preparation of 20-bis-(hydroxymethyl)-pregnanes of Formula I comprises condensing 3α-acyloxy-5β-androstane-11,17-dione wherein the acyl group is derived from a lower aliphatic carboxylic acid having 2 to 7 carbon atoms with ethyl cyanoacetate in an inert organic solvent such as benzene in the presence of an alkaline catalyst such as pyridine, piperidine or ammonia and with or without the presence of acetic acid to form the ethyl ester of 3α-acyloxy-20-cyano-$\Delta^{17(20)}$-5β-pregnene-11-one-21-oic acid, where acyl represents the acyl radical of said lower aliphatic carboxylic acid, catalytically hydrogenating the latter in an oragnic solvent such as a mixture of tetrahydrofuran and ethanol in the presence of palladized carbon black to form the ethyl ester of 3α-acyloxy-20-cyano-5β-pregnane-11-one-21-oic acid, where acyl represents the acyl radical of said lower aliphatic carboxylic acid, simultaneously saponifying and hydrolyzing the latter with an aqueous methanol solution of an alkali metal hydroxide such as potassium hydroxide to form 20-carboxy-5β-pregnane-3α-ol-11-one-21-oic acid, esterifying the latter with methanol in the presence of anhydrous hydrochloric acid to form the dimethyl ester of 20-carboxy-5β-pregnane-3a-ol-11-one-21-oic acid, reacting the latter with 2,3-dihydropyran in the presence of p-toluene sulfonic acid to form the dimethyl ester of 3α-[2'-tetrahydropyranyloxy]-20-carboxy-5β-pregnane-11-one-21-oic acid, condensing the latter in the form of its sodium derivative with benzyloxy chloromethane in a solution of a mixture of dimethylformamide and toluene to form the dimethyl ester of 3α-[2'-tetrahydropyranyloxy]-20-carboxy-20-benzyloxymethyl-5β-pregnane-11-one-21-oic acid, hydrolyzing the latter with hydrochloric acid in methanol to form the dimethyl ester of 20-carboxy-20-benzyloxymethyl-5β-pregnane-3α-ol-11-one-21-oic acid, reducing the latter in tetrahydrofuran with lithium aluminum hydride to form 20-hydroxymethyl-20-benzyloxymethyl-5β-pregnane-3α,11β,21-triol, subjecting the latter in ethanol to catalytic hydrogenolysis in the presence of palladized carbon black to form 20-bis-(hydroxymethyl)-5β-pregnane-3α,11β,21-triol, esterifying the latter with the desired acid anhydride of a lower aliphatic carboxylic acid having from 2 to 7 carbon atoms, such as acetic acid anhydride, in the presence of pyridine to form 3α,21-diacyloxy-20-bis-(acyloxymethyl)-5β-pregnane - 11β - ol, where acyl represents the acyl radical of said lower aliphatic carboxylic acid, oxidizing the latter in aqueous acetone with a sulfochromic oxidizing agent to form 3α,21-diacyloxy-20-bis-(acyloxymethyl) - 5β - pregnane - 11-one, where acyl represents the acyl radical of said lower aliphatic carboxylic acid, saponifying the latter with an alkali metal hydroxide in a lower alkanol such as sodium hydroxide in methanol to form 20-bis-(hydroxymethyl)-5β-pregnane-3α,21-diol-11-one, reacting the latter with ethyl orthoformate in an anhydrous solvent to form 1'-(5β-androstane-3α-ol-11-one-17β-yl) - 3',5',8' - trioxa-bicyclo [2,2,2]-octane, esterifying the latter with the desired acid anhydride of a lower aliphatic carboxylic acid having from 2 to 7 carbon atoms, preferably acetic anhydride, in the presence of pyridine to form the corresponding 3α-acyloxy derivative, where acyl represents the acyl radical of said lower aliphatic carboxylic acid, hydrolyzing the latter with hydrochloric acid in methanol to form 3α-acyloxy-20-bis-(hydroxymethyl)-5β-pregnane-21-ol-11-one, where acyl represents the acyl radical of said lower aliphatic carboxylic acid, and recovering the latter. The reaction scheme is illustrated in Table I.

TABLE I

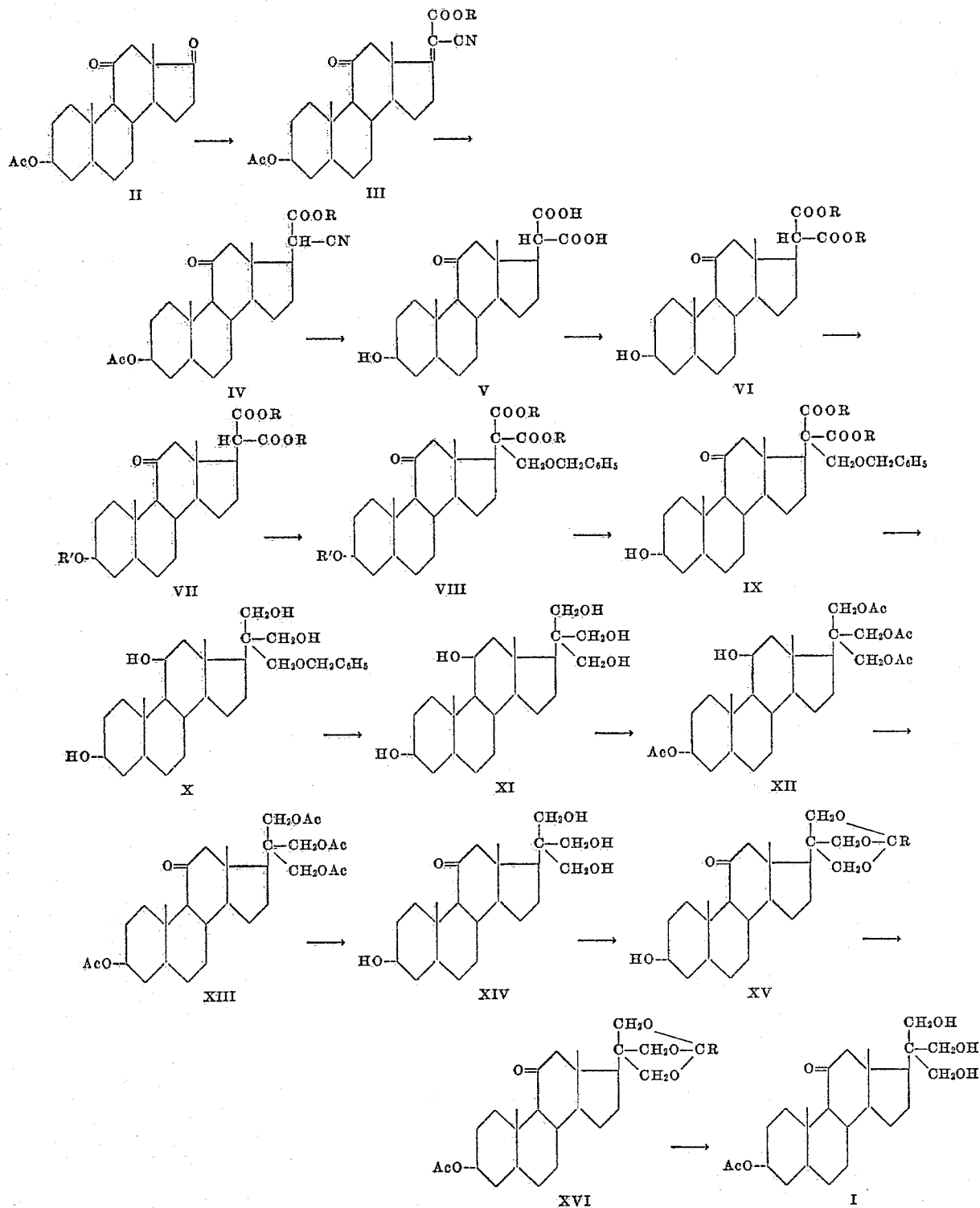

wherein Ac has the above definition, R is a lower alkyl radical, and R' is an oxa cyclic compound radical.

While the preferred acid ester is the acetic acid ester, other aliphatic carboxylic acids having 2 to 7 carbon atoms may be used. Examples of suitable acids are the lower alkanoic acids such as trimethylacetic acid, propionic acid, 4,4-dimethyl pentanoic acid; acrylic acid; crotonic acid, methacrylic acid; etc.

In the following example there are described several preferred embodiments to illustrate the invention. However, it should be understood that the invention is not intended to be limited to the specific embodiments.

The instantaneous melting points were determined on the Kofler block and the temperatures are expressed in degrees centigrade.

EXAMPLE

*Preparation of 3α-Acetoxy-20-Bis-(Hydroxymethyl)-5β-Pregnane-21-Ol-11-One*

*Step A.—Preparation of the ethyl ester of 3α-acetoxy-20-cyano-Δ$^{17(20)}$-5β-pregnene-11-one-21-oic acid (III).* The following reaction mixture was prepared:

| | |
|---|---|
| 3α-acetoxy-5β-androstane-11,17-dione (II) ___g__ | 37.380 |
| Ethyl cyanoacetate _____cc__ | 24.6 |
| Benzene _____cc__ | 480 |
| Acetic acid _____cc__ | 60 |
| Ammonium acetate _____g__ | 6 |

This mixture was heated on an oil bath and maintained at reflux under an atmosphere of nitrogen for a period of 30 hours. In the course of the first 9 hours of reflux, four equal amounts of 3 g. each of ammonium acetate were added and in the course of the last 7 hours, ammonium acetate was added in three amounts of 3 g. each. The water formed in the course of the reaction was eliminated by continuous entrainment and recovery in a separator.

The solution obtained was cooled, poured into a mixture of water and ice, decanted, and the water extracted twice with benzene. The combined benzenic extracts were washed with water, then with a saturated solution of sodium bicarbonate and again with water until the wash waters were neutral. The benzenic solution was dried over magnesium sulfate, filtered and distilled to dryness under vacuum.

The raw product thus obtained was heated to reflux in isopropyl ether, then cooled under agitation. The precipitate was vacuum filtered and triturated several times with iced isopropyl ether. It was recrystallized again by dissolution in refluxing ethanol and cooled to about 0° C. The it was vacuum filtered and triturated with iced ethanol. 24 g. of the ethyl ester of "cis" 3α-acetoxy-20-cyano-Δ$^{17(20)}$-pregnene-11-one-21-oic acid, having a melting point of 185–186° C. and a specific rotation $[α]_D^{20} = +67°$ (c.=1% in acetone), were obtained.

In order to facilitate matters, the compound whose methyl function in the 18-position and cyano function in the 18-position and cyano function in the 20-position were on the same side with reference to the 17,20-double bond was called "cis."

The product was soluble in ether, acetone, benzene, chloroform, soluble in hot alcohol, slightly soluble in isopropyl ether.

*Analysis.* — $C_{26}H_{35}O_5N$; molecular weight=441.55. Calculated: C, 70.71%; H, 7.99%; N, 3.18%. Found: C, 71.0%; H, 8.1%; N, 3.3%.

4.050 g. of the ethyl ester of "trans" 3α-acetoxy-20-cyano-Δ$^{17(20)}$-pregnene-11-one-21-oic acid were obtained from the isopropyl ether mother liquors by distillating them to dryness under vacuum, repeated taking up of the residue in ethanol and crystallization followed by trituration with ethanol and finally drying. A product was obtained whose melting point was 163–164° C. and a specific rotation was $[α]_D^{20} = +67.8°$ (c.=1% in acetone), which corresponded to the trans isomer (after the definition above). It was soluble in ether, acetone, benzene, chloroform, slightly soluble in hot ethanol, moderately soluble in isopropyl ether.

*Analysis.* — $C_{26}H_{35}O_5N$; molecular weight=441.55 (product slightly solvated). Calculated: C, 70.71%, H, 7.99%; N, 3.18%. Found: C, 70.8%; H, 8.4%; N, 3.4%.

These two isomers are not described in the literature.

*Step B.—Preparation of the ethyl ester of 3α-acetoxy-20-cyano-5β-pregnane-11-one-21-oic acid (IV).* The hydrogenation was effected under the same conditions whether the cis or trans isomer of the ethyl ester of 3α-acetoxy-11-oxo-20-cyano-Δ$^{17(20)}$-5β-pregnane-21-oic acid (III) was used as the starting compound.

A suspension of 6.8 g. of palladized carbon black containing 10% of palladium in 170 cc. of ethanol was prepared. Then a solution of 34 g. of the ethyl ester of 3α-acetoxy-20-cyano-Δ$^{17(20)}$-5β-pregnene-11-one-21-oic acid in 170 cc. of tetrahydrofuran and 170 cc. of absolute ethanol was introduced. Next, 7.8 cc. of 0.1 N solution of sodium hydroxide were added. The reaction vessel was purged of air and hydrogenation was effected for a duration of about 20 minutes. The catalyst was filtered and the solution was neutralized by addition of acetic acid and was evaporated under vacuum. The crystalline residue represented the raw product. Purification was effected by repeated crystallizations from isopropyl ether. 29 g. of the ethyl ester of 3α-acetoxy-20-cyano-5β-pregnane-11-one-21-oic acid were obtained whose melting point was 150° C. (after desolvatation)., having a specific rotation $[α]_D^{20} = +52°±2°$ (c.=0.8% in acetone). It was soluble in acetone, benzene and chloroform, moderately soluble in alcohol and ether, and slightly soluble in isopropyl ether.

*Analysis.* — $C_{26}H_{37}O_5N$; molecular weight=443.56. Calculated: C, 70.41%; H, 8.41%. Found: C, 70.6%; H, 8.6%.

This compound is not described in the literature.

Starting from the said ethyl ester, one obtained by condensation of formaldehyde the ethyl ester of 3α-acetoxy-20 - cyano - 20-hydroxymethyl-5β-pregnane-11-one-21-oic acid, having a melting point of about 180° C. This product was soluble in alcohol, acetone, benzene and chloroform, slightly soluble in isopropyl ether, and decomposed in dilute aqueous acids and alkalis.

This product is not described in the literature.

By saponification of the said product 20-cyano-20-hydroxymethyl-5β-pregnane-3α-ol-11-one-21-oic acid, having a melting point of about 260° C. was obtained. This product was soluble in alcohol and dilute aqueous alkalis, slightly soluble in benzene.

It is not described in the literature.

On the other hand by condensation of the said ethyl ester with benzyloxy chloromethane, the ethyl ester of 3α - acetoxy - 20-cyano-20-benzyloxymethyl-5β-pregnane-11-one-21-oic acid was obtained having a melting point of 139° C. It was soluble in ether, acetone, benzene and chloroform.

*Analysis.*—$C_{34}H_{45}O_6N$; molecular weight=563.71. Calculated: C, 72.44%; H, 8.05%; N, 2.48%. Found: C, 72.4%; H, 8.1%; N, 2.7%.

This compound is not described in the literature.

*Step C.—Preparation of 20-carboxy-5β-pregnane-3α-ol-11-one-21-oic acid (V).* The following reaction mixture was prepared:

| | |
|---|---|
| Ethyl ester of 3α-acetoxy-20-cyano-5β-pregnane-11-one-21-oic acid (IV) _____g__ | 70 |
| Methanol _____cc__ | 116 |
| Water _____cc__ | 70 |
| Potassium hydroxide solution _____cc__ | 23 |

The mixture was heated to 40° C. (interior temperature) and agitated for a period of about 20 minutes at this temperature. Then 560 cc. of potassium hydroxide solution and 700 cc. of water were added. The mixture was heated to reflux until solution of the precipitate formed occurred. Then it was maintained in an oil bath whose temperature was of the order of about 135° C. for a period of about 17 hours.

Next it was cooled to 20° C. The mixture was poured into water and ice and acidified under agitation by the addition of 875 cc. of concentrated hydrochloric acid while maintaining the interior temperature below 25° C. The mixture was extracted several times with ether. The ethereal solutions were washed with water and then with a saturated solution of sodium carbonate several times.

The carbonated waters were combined and acidified under agitation by addition of 250 cc. of concentrated hydrochloric acid. The precipitate obtained was extracted several times with ether and the combined extracts were washed with water. After repeated extractions of the wash water, the organic solutions were combined, dried over sodium sulfate, treated with animal charcoal and distilled to dryness.

The residue which represented the raw product was taken up in methylene chloride, triturated at elevated temperatures and then iced for a period of 30 minutes. The crystals obtained were vacuum filtered, triturated twice with methylene chloride and dried. 58.8 g. of 20-carboxy-5β-pregnane-3α-ol-11-one-21-oic acid (V) were obtained having a melting point of 215–220° C. (with decomposition).

The product was soluble in alcohol, acetone, ethyl acetate and dilute aqueous alkalis, slightly soluble in ether, insoluble in benzene and chloroform.

*Analysis.*—$C_{22}H_{32}O_6$; molecular weight=392.48. Calculated: C, 67.31%; H, 8.22%. Found: C, 67.5%; H, 8.1%.

This compound is not described in the literature.

On the other hand, by varying the operating conditions, the reaction can be oriented toward other products such as:

(*a*) By operating in less harsh conditions, the nitrile group remained intact and 20-cyano-5β-pregnane-3α-ol-11-one-21-oic acid was obtained having a melting point of about 255° C. It was soluble in alcohol, slightly soluble in ethyl acetate and dilute aqueous alkalis. This compound is not described in the literature.

(*b*) By operating at elevated temperatures, saponification was accompanied by decarboxylation and 5β-pregnane-3α-ol-11-one-21-oic acid was obtained, having a melting point of 247° C. This compound is not described in the literature.

*Step D.*—*Preparation of the dimethyl ester of 20-carboxy-5β-pregnane-3α-ol-11-one-21-oic acid (VI).* 48 g. of 20-carboxy-5β-pregnane-3α-ol-11-one-21-oic acid were introduced into 960 cc. of methanol containing 7% of dry hydrochloric acid and the mixture was heated to reflux temperature for a period of about an hour and a quarter. Next it was distilled to dryness under vacuum and the residue was taken up in 250 cc. of methylene chloride. The extract was washed three times with water, then with a saturated solution of sodium bicarbonate and again several times with water. The wash waters were subjected to repeated extractions with methylene chloride.

The extract were combined, dried over sodium sulfate, treated with animal charcoal, filtered and distilled to dryness. The residue was taken up in 100 cc. of ether. To the solution obtained, 100 cc. of isopropyl ether were added and the solution was allowed to remain overnight at cold temperatures. Next it was vacuum filtered and the crystals obtained were triturated twice with a mixture of ether and isopropyl ether. 46.038 g. of the dimethyl ester of 20-carboxy-5β-pregnane-3α-ol-11-one-21-oic acid (VI) were obtained having a melting point of 134–138° C. The product was soluble in alcohol, acetone, benzene, chloroform and mixed ether-ethyl acetate, slightly soluble in ether.

*Analysis.*—$C_{22}H_{36}O_6$; molecular weight=420.53. Calculated: C, 68.55%; H, 8.63%. Found: C, 68.3%; H, 8.8%.

This compound is not described in the literature.

On the other hand, one can obtain in the same fashion, the diethyl ester of 20-carboxy-5β-pregnane-3α-ol-11-one-21-oic acid, having a melting point of 144° and 147° C. It was slightly soluble in alcohol, acetone, benzene and chloroform, soluble in isopropyl ether, ethanol and aqueous methanol, insoluble in water.

This compound is not described in the literature.

Starting from the said dimethyl ester, one obtained by acetylation with acetic anhydride and pyridine mixtures the dimethyl ester of 3α-acetoxy-20-carboxy-5β-pregnane-11-one-21-oic acid, having a melting point of 148° and 154° C. It was soluble in alcohol, ether, acetone, benzene and chloroform, insoluble in water.

*Analysis.*—$C_{26}H_{38}O_7$; molecular weight=462.56. Calculated: C, 67.50%; H, 8.28%; O, 24.21%. Found: C, 67.4%; H, 8.3%; O, 24.3%.

This compound is not described in the literature.

*Step E.*—*Preparation of the dimethyl ester of 3α-[2'-tetrahydropyranyloxy] - 20-carboxy-5β-pregnane-11-one-21-oic acid (VII).* 45.5 g. of the dimethyl ester of 20-carboxy-5β-pregnane-3α-ol-11-one-21-oic acid (VI) and 0.94 g. of p-toluene sulfonic acid in 136 cc. of ether were placed in suspension at room temperature under an atmosphere of nitrogen and under agitation. 10 cc. of 2,3-dihydropyrane were added in one amount. Then a second batch of 5.7 cc. of 2,3-dihydropyrane was added about 15 minutes later. The agitation was continued for a period of 2 hours and the solution was neutralized by the addition of 4 g. of sodium carbonate. The mixture was agitated again for a period of an hour and 0.5 cc. of pyridine was added. Next the mixture was filtered. The filter cake was extracted several times with ether and distilled to dryness.

The resinous residue was recrystallized from hot petroleum ether, then allowed to remain overnight in the refrigerator. The crystals obtained were vacuum filtered, triturated several times with petroleum ether and dried under vacuum. 42.975 g. of the dimethyl ester of 3α-[2'-tetrahydropyranyloxy] - 20-carboxy-5β-pregnane-11-one-21-oic acid (VII) were obtained having a melting point of 132–134° C.

It was soluble in alcohol, ether, acetone, benzene, chloroform and petroleum ether, insoluble in water and dilute aqueous alkalis and decomposed in dilute aqueous acids.

*Analysis.*—$C_{29}O_{44}O_7$; molecular weight=504.65. Calculated: C, 69.02%; H, 8.79%. Found: C, 69.1%; H, 8.8%.

This compound is not described in the literature.

*Step F.*—*Preparation of the dimethyl ester of 20-carboxy - 20-benzyloxymethyl-5β-pregnane-3α-ol-11-one-21-oic acid (IX).* Into 30 cc. of methanol, under an atmosphere of nitrogen, 1.650 g. of sodium were introduced. Then after its solution, 45 mg. of magnesium were added in the presence of iodine and the reaction heated to reflux. Next 60 cc. of dimethylformamide were introduced and, after disappearance of the magnesium, the introduction of nitrogen was stopped. The system was placed under vacuum and the excess methanol was removed. Then at normal pressure a solution of 30 g. of the dimethyl ester of 3α-[2'-tetrahydropyranyloxy]-20-carboxy-5β-pregnane-11-one-21-oic acid (VII) in 120 cc. of toluene was added. The reaction mixture was placed under reduced pressure and heated to 80° C. (interior temperature). Then the methanol formed during the course of the reaction as well as toluene were distilled therefrom (volume distilled: about 100 cc.).

The mixture was cooled to +30° C. and under normal pressure and under an atmosphere of nitrogen, 13.8 g. of benzyloxy chloromethane were added. The mixture was maintained for a period of about one hour at a temperature of 50° C., then cooled to room temperature and agitated for a period of about 15 to 16 hours.

The reaction mixture was poured on a mixture of water and ice, agitated for a period of 45 minutes, extracted several times with benzene. The extracts were washed successively with water, with a dilute solution of sodium bicarbonate and with water until the wash waters were neutral. The combined extracts were dried over magnesium, treated with animal charcoal, filtered and evaporated to dryness under vacuum. The dimethyl ester of $3\alpha$ - [2' - tetrahydropyranyloxy]-20-carboxy-20-benzyloxymethyl-$5\beta$-pregnane-11-one-21-oic acid (VII) were obtained which utilized as such for the next step.

This compound is not described in the literature.

The resinous residue was taken up with 210 cc. of methanol. 4.2 cc. of 6 N hydrochloric acid were added. The mixture was agitated for a period of about 1 hour at room temperature, then slowly diluted by the addition of 75 cc. of water. The product crystallized. The product was vacuum filtered, washed with water and dried. 23.3 g. of the dimethyl ester of 20-carboxy-20-benzyloxymethyl-$5\beta$-pregnane-$3\alpha$-ol-11-one-21-oic acid were obtained.

The product was purified by recrystallization at elevated temperatures and cooling in methanol or by chromatography over magnesium silicate (trademarked "Florisil") with elution with methylene chloride and had a melting point of 152° C. and a specific rotation $$[\alpha]_D^{20} = +47°$$

(c.=0.6% in acetone).

*Analysis.*—$C_{32}H_{44}O_7$; molecular weight=540.67. Calculated: C, 71.09%; H, 8.20%. Found: C, 71.1%; H, 8.1%.

The product was soluble in alcohol, acetone, benzene and chloroform, moderately soluble in ether, slightly soluble in isopropyl ether, insoluble in water.

This compound is not described in the literature.

On the other hand, it is also possible to prepare other esters such as the dimethyl ester of 20-hydroxymethyl-20-carboxy-$5\beta$-pregnane-$3\alpha$-ol-11-one-21-oic acid, for example, which can be used for the following steps of the synthesis. This last compound was prepared by condensation of formaldehyde on the dimethyl ester of 20-carboxy-$5\beta$-pregnane-$3\alpha$-ol-11-one-21-oic acid (VI). The novel ester had a melting point of 184–186° C. It was soluble in chloroform, slightly soluble in a mixture of water and dioxane and in alcohol. Dilute aqueous acids and alkalis decomposed it.

*Analysis.*—$C_{25}H_{38}O_7$; molecular weight=450.55. Calculated: C, 66.64%; H, 8.50%. Found: C, 66.4%; H, 8.4%.

This compound is not described in the literature.

*Step G.—Preparation of 20-bis-(hydroxymethyl)-$5\beta$-pregnane-$3\alpha,11\beta,21$-triol (XI).* 6.7 g. of lithium aluminum hydride were introduced in small amounts under an atmosphere of nitrogen and under agitation into 200 cc. of tetrahydrofuran. Then over a period of several minutes at a temperature between about +10° and 15° C. a solution of 6.7 g. of the dimethyl ester of 20-carboxy - 20 - benzyloxymethyl - $5\beta$ - pregnane - $3\alpha$ - ol-11-one-21-oic acid (IX) in 200 cc. of tetrahydrofuran were added. The reaction mixture was brought to room temperature and agitated for a period of about 5½ hours. It was cooled to a temperature between about +5° and 15° C. and the excess hydride was destroyed by slow addition of 67 cc. of ethyl acetate. Then the mixture was heated to +20° C., agitated for a period of about 15 minutes and 135 cc. of a saturated solution of sodium chloride were introduced.

The organic solution was separated from the aluminum hydroxide which was washed twice with ethyl acetate. The organic phases were combined and washed with saline water, dried over magnesium sulfate and evaporated to dryness under vacuum. 6.2 g. of raw 20-hydroxymethyl - 20 - benzyloxymethyl - $5\beta$ - pregnane-$3\alpha,11\beta,21$-triol (X) were obtained which were used as such for the following step.

This compound is not described in the literature.

1.5 g. of palladized carbon black containing 10% palladium were introduced under an atmosphere of nitrogen into 100 cc. of absolute ethanol. Then a solution of 6.2 g. of the raw 20-hydroxymethyl-20-benzyloxymethyl-$5\beta$-pregnane-$3\alpha,11\beta,21$-triol (X) obtained in the preceding step in 500 cc. of ethanol was added. The mixture was agitated with introduction of hydrogen until it was saturated.

Then the reaction mixture was filtered. The filter cake was washed several times with alcohol and the combined organic phases were concentrated under vacuum and agitation, then cooled to 0° C. The crystalline precipitate was vacuum filtered, washed with iced alcohol and dried. 4.1 g. of 20-bis-(hydroxymethyl)-$5\beta$-pregnane-$3\alpha,11\beta,21$-triol (XI) were obtained having a melting point of 271–272° C. and a specific rotation $[\alpha]_D^{20} = +35.7°$ (c.=0.28% in ethanol). By concentration of the mother liquors of the first batch, another 0.880 g. of product were obtained.

*Analysis.*—$C_{23}H_{40}O_5$; molecular weight=396.55. Calculated: C, 69.67%; H, 10.17%. Found: C, 69.5%; H, 10.0%.

The product was very slightly soluble in alcohol insoluble in water, ether, acetone, benzene and chloroform.

This compound is not described in the literature.

*Step H.—Preparation of 20-bis-(hydroxymethyl)-$5\beta$-pregnane-$3\alpha,21$-diol-11-one (XIV).* 300 mg. of 20-bis-(hydroxymethyl)-$5\beta$-pregnane-$3\alpha,11\beta,21$-triol (XI) were placed in suspension at room temperature in 2.4 cc. of pyridine. 1.2 cc. of acetic anhydride were added. The mixture was agitated for a period of 4 hours and poured into a mixture of water and ice. A resin was obtained which was extracted with methylene chloride. The organic extract was washed successively with dilute hydrochloric acid, with a dilute aqueous solution of sodium bicarbonate, then with water until the wash waters were neutral. The extracts were dried over sodium sulfate and evaporated to dryness in a vacuum. Raw $3\alpha,21$-diacetoxy - 20 - bis - (acetoxymethyl) - $5\beta$ - pregnane-$11\beta$-ol (XII) which was employed as such for the next step was obtained.

This compound is not described in the literature.

The residue obtained above was taken up in 21.5 cc. of acetone. The solution obtained was cooled to between 0° and +5° C. and over a period of about 10 minutes 0.33 cc. of the following solution was added thereto:

Chromic acid anhydride _____ g__ 13.5
Concentrated sulfuric acid _____ cc__ 11.5
Water _____ cc__ 50

The reaction mixture was agitated for a period of 20 minutes at about +5° C. Then 2 to 3 cc. of methanol were added and finally the mixture was neutralized by a large excess of sodium bicarbonate. The reaction mixture was next filtered. The filter cake was extracted with acetone and the filtrate and acetone of the extraction were combined and evaporated to dryness under vacuum. Raw $3\alpha,21$ - diacetoxy - 20 - bis - (acetoxymethyl) - $5\beta$-pregnane-11-one (XIII) was obtained which was used as such for the next step.

This compound is not described in the literature.

The residue obtained above was dissolved in 8.2 cc. of methanol. 0.82 cc. of a 10 N solution of sodium hydroxide was added and the reaction mixture was heated to reflux for a period of about 15 minutes. The mixture was then cooled to about 20° C., diluted with 8.2 cc. of water and the solution was neutralized with 0.6 cc. of acetic acid. The methanol was removed by distillation under a slight vacuum and then the mixture was cooled to 10° C. The crystals obtained were finally vacuum filtered and washed with water. 263 mg. of 20-bis-(hydroxymethyl)-5β-pregnane-3α,21-diol-11-one (XIV) were obtained, having a melting point of 243° and 247–248° C. and a specific rotation $[\alpha]_D^{20} = +40°$ (c.=0.5% in ethanol). This product is identical to that described in the copending, commonly assigned patent application Serial No. 116,976 mentioned at the start of this text.

*Step I.—Preparation of 1'-[5β-androstane-3α-ol-11-one-17β-yl]-3',5',8'-trioxabicyclo-[2,2,2]-octane (XV).* 0.36 g. of 20-bis-(hydroxymethyl)-5β-pregnane-3α,21-diol-11-one (XIV) were placed in suspension in 8 cc. of anhydrous chloroform. Then 0.36 cc. of ethyl orthoformate and 7 mg. of p-toluene sulfonic acid were added. The mixture was agitated under an atmosphere of nitrogen at room temperature for a period of about 2 hours. Next the reaction mixture was neutralized by addition of sodium carbonate, then pyridine. Finally the reaction mixture was filtered. The solvent was distilled therefrom and carbon tetrachloride was added to the resin obtained. This provoked a solidification of the product. 0.190 g. of raw 1'-[5β-androstane-3α-ol-11-one-17β-yl]-3',5',8'-trioxa-bicyclo(2,2,2)-octane were obtained which was purified by chromatograph over Florisil with elution with methylene chloride containing 1% of methanol. The product subjected to chromatography was twice recrystallized from a mixture of 3 volumes of methylene chloride and 20 volumes of ether. A product whose melting point was 230° C. was obtained.

This product was soluble in benzene and chloroform, slightly soluble in ether, insoluble in water. Dilute aqueous acids decomposed it.

*Analysis.*—$C_{24}H_{36}O_5$; molecular weight=404.53. Calculated: C, 71.25%; H, 8.97%. Found: C, 71.5%; H, 9.1%.

This compound is not described in the literature.

*Step J.—Preparation of 1'-[3α-acetoxy-5β-androstane-11-one-17β-yl] - 3',5',8' - trioxabicyclo - [2,2,2] - octane (XVI).* 0.103 g. of 1'-[5β-androstane-3α-ol-11-one-17β-yl]-3',5',8'-trioxabicyclo-[2,2,2]-octane (XV) was dissolved in a mixture of 0.8 cc. of pyridine and 0.3 cc. of acetic acid anhydride and the reaction mixture was held for 3 hours at room temperature. At the end of the reaction, sufficient water was added to hydrolyze the acetic acid anhydride. The precipitate obtained was vacuum filtered and washed with water. 0.112 g. of raw 1'-[3α-acetoxy-5β-androstane-11-one-17β-yl] - 3',5',8'-trioxabicyclo-(2,2,2)-octane was obtained which was recrystallized from isopropanol containing traces of pyridine. The product obtained had a melting point of 243° C.

The product was soluble in benzene and chloroform, slightly soluble in alcohol and ether, very slightly soluble in a mixture of propylene glycol and water, insoluble in water; dilute aqueous acids decompose it.

*Analysis.*—$C_{26}H_{38}O_6$; molecular weight=446.56. Calculated: C, 69.9%; H, 8.58%. Found: C, 70.3%; H, 8.5%.

This compound is not described in the literature.

*Step K.—Preparation of 3α-acetoxy-20-bis-(hydroxymethyl)-5β-pregnane-21-ol-11-one (I).* 14 mg. of 1'-[3α-acetoxy-5β-androstane-11-one-17β-yl] - 3',5',8'-trioxabicyclo-[2,2,2]-octane (XVI), were placed in suspension in a mixture of 0.14 cc. of methanol and 0.05 cc. of 6 N hydrochloric acid. The mixture was agitated for a period of 30 minutes, then diluted with water. The precipitate obtained was vacuum filtered, washed with water and dried. 12 mg. of 3α-acetoxy-20-bis-(hydroxymethyl)-5β-pregnane-21-ol-11-one were obtained which purified from ethyl acetate, melted at 193° C., then at 212° C.

The product is identical to that described in the copending, commonly assigned patent application Serial No. 116,976 mentioned at the start of this text.

Various modifications of the process of the present invention may be made without departing from the spirit or scope thereof, and it is to be understood that the invention is to be limited only as defined in the appended claims.

We claim:

1. A process for the preparation of 20-bis-(hydroxymethyl)-pregnanes having the formula

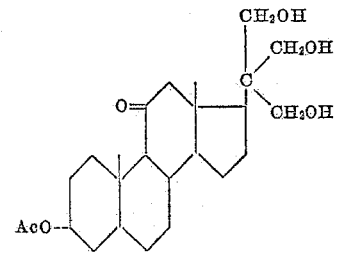

wherein Ac is the acyl radical of a lower aliphatic carboxylic acid having 2 to 7 carbon atoms which comprises condensing 3α-acyloxy-5β-androstane-11,17-dione wherein the acyl group is derived from a lower aliphatic carboxylic acid having 2 to 7 carbon atoms with a lower alkyl cyanoacetate to form the lower alkyl ester of 3α-acyloxy-20-cyano-$\Delta^{17(20)}$-5β-pregnene-11-one-21-oic acid, catalytically hydrogenating the latter in the presence of a palladium catalyst to form the lower alkyl ester of 3α-acyloxy-20-cyano-5β-pregnane-11-one-21-oic acid, simultaneously hydrolyzing and saponifying the latter under alkaline conditions to form 20-carboxy-5β-pregnane-3α-ol-11-one-21-oic acid, esterifying the latter with a lower alkanol in the presence of a dehydrating agent to form the di-lower alkyl ester of 20-carboxy-5β-pregnane-3α-ol-11-one-21-oic acid, reacting the latter with 2,3-dihydropyran to form the di-lower alkyl ester of 3α-[2'-tetrahydropyranyloxy] - 20-carboxy-5β-pregnane-11-one-21-oic acid, condensing the latter in the form of an alkali metal derivative with benzyloxy chloromethane to form the di-lower alkyl ester of 3α-[2'-tetrahydropyranyloxy]-20-carboxy-20-benzyloxymethyl - 5β - pregnane-11-one-21-oic acid, hydrolyzing the latter under acidic conditions to form the di-lower alkyl ester of 20-carboxy-20 - benzyloxymethyl-5β-pregnane-3α-ol-11-one-21-oic acid, reducing the latter with an alkaline hydride to form 20-hydroxymethyl-20-benzyloxymethyl-5β-pregnane-3α,11β,21-triol, subjecting the latter to catalytic hydrogenolysis to form 20-bis-(hydroxymethyl)-5β-pregnane-3α,11β,21-triol, esterfying the latter with an acylating agent to form 3α,21-diacyloxy-20-bis-(acyloxymethyl)-5β-pregnane-11β-ol wherein the acyl radical is derived from a lower aliphatic carboxylic acid having 2 to 7 carbon atoms, oxidizing the latter with a sulfuric acid-chromic acid agent to form 3α,21-diacyloxy-20-bis-(acyloxymethyl)-5β-pregnane-11-one, saponifying the latter under alkaline conditions to form 20-bis-(hydroxymethyl)-5β-pregnane-3α,21-diol-11-one, reacting the latter with a lower alkyl ortho lower aliphatic acylate to form a 1'-(5β-androstane-3α-ol-11-one-17β-yl)-3',5',8'-trioxabicyclo-[2,2,2]-octane compound, esterfying the latter with an acylating agent of a lower aliphatic carboxylic acid having 2 to 7 carbon atoms to form a 1'-(3α-acyloxy-5β-androstane-11-one-17β-yl) - 3',5',8'-trioxabicyclo-[2,2,2]-octane compound, hydrolyzing the latter under acidic conditions to form 3α-acyloxy-20-(bishydroxymethyl)-5β-pregnane-21-ol-11-one wherein the acyl radical is derived from a lower aliphatic carboxylic acid having 2 to 7 carbon atoms and recovering the latter.

2. A process for the preparation of 20-bis-(hydroxymethyl)-5β-pregnane-3α,21-diol-11-one which comprises condensing 3α-acyloxy-5β-androstane-11,17-dione wherein the acyl group is derived from a lower aliphatic carboxylic acid having 2 to 7 carbon atoms with a lower alkyl cyanoacetate to form the lower alkyl ester of 3α-acyloxy-20-cyano-$\Delta^{17(20)}$-5β-pregnene-11-one-21-oic acid, catalytically hydrogenating the latter in the presence of a palladium catalyst to form the lower alkyl ester of 3α-acyloxy-20-cyano-5β-pregnane-11-one-21-oic acid, simultaneously hydrolyzing and saponifying the latter under alkaline conditions to form 20-carboxy-5β-pregnane-3α-ol-11-one-21-oic acid, esterifying the latter with a lower alkanol in the presence of a dehydrating agent to form the di-lower alkyl ester of 20-carboxy-5β-pregnane-3α-ol-11-one-21-oic acid, reacting the latter with 2,3-dihydropyran to form the di-lower alkyl ester of 3α-[2'-tetrahydropyranyloxy]-20-carboxy - 5β - pregnane-11-one-21-oic acid, condensing the latter in the form of an alkali metal derivative with benzyloxy chloromethane to form the di-lower alkyl ester of 3α-[2'-tetrahydropyranyloxy)-20-carboxy - 20 - benzyloxymethyl-5β-pregnane-11-one-21-oic acid, hydrolyzing the latter under acidic conditions to form the di-lower alkyl ester of 20-carboxy-20-benzyloxymethyl-5β - pregnane-3α-ol-11-one-21-oic acid, reducing the latter with an alkaline hydride to form 20-hydroxymethyl-20-benzyloxymethyl-5β-pregnane-3α,11β,21-triol, subjecting the latter to catalytic hydrogenolysis to form 20-bis-(hydroxymethyl)-5β-pregnane-3α,11β,21-triol, esterifying the latter with an acylating agent to form 3α,21-diacyloxy-20-bis-(acyloxymethyl)-5-pregnane-11β-ol wherein the acyl radical is derived from a lower aliphatic carboxylic acid having 2 to 7 carbon atoms, oxidizing the latter with a sulfuric acid-chromic acid agent to form 3α,21-diacyloxy-20-bis-(acyloxymethyl)-5β-pregnane-11-one, saponifying the latter under alkaline conditions to form 20-bis-(hydroxymethyl)-5β-pregnane-3α,21-diol-11-one, and recovering the latter.

3. The process of claim 1, wherein the condensation with the lower alkyl cyanoacetate is effected in benzene in the presence of a nitrogen base.

4. The process of claim 1, wherein the catalytic hydrogenation of the $\Delta^{17(20)}$-double bond is effected in a mixture of tetrahydrofuran and ethanol in the presence of palladized carbon black.

5. The process of claim 1, wherein the catalytic hydrogenolysis is effected in ethanol in the presence of palladized carbon black.

6. The process of claim 1, wherein the saponification of 3α,21-diacyloxy-20-bis-(acyloxymethyl)-5β-pregnane-11-one is effected with sodium hydroxide in methanol.

7. The process of claim 1, wherein 20-bis-(hydroxymethyl)-5β-pregnane-3α,21-diol-11-one is reacted with a lower alkyl ortho lower aliphatic acylate in an anhydrous medium.

8. A process for the preparation of 20-bis-(hydroxymethyl)-pregnanes having the formula

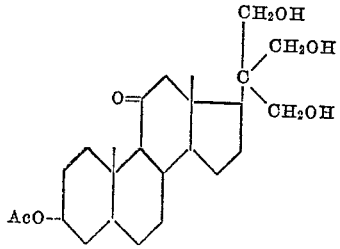

wherein Ac is the acyl radical of acetic acid, which comprises condensing 3α - acyloxy-5β-androstane-11,17-dione wherein the acyl group is derived from an aliphatic acid having 2 to 7 carbon atoms with ethyl cyanoacetate in benzene in the presence of an alkaline catalyst to form the ethyl ester of 3α-acyloxy-20-cyano-$\Delta^{17(20)}$-5β-pregnene-11-one-21-oic acid, hydrogenating the latter in a mixture of tetrahydrofuran and ethanol in the presence of palladized carbon black to form the ethyl ester of 3α-acyloxy-20-cyano - 5β - pregnane-11-one-21-oic acid, simultaneously saponifying and hydrolyzing the latter with an aqueous methanol solution of potassium hydroxide to form 20-carboxy - 5β - pregnane-3α-ol-11-one-21-oic acid, reacting the latter with methanol in the presence of hydrochloric acid to form the dimethyl ester of 20-carboxy-5β-pregnane-3α-ol-11-one-21-oic acid, reacting the latter with 2,3-dihydropyran in the presence of p-toluene sulfonic acid to form the di methyl ester of 3α-[2'-tetrahydropyranyloxy]-20-carboxy-5β-pregnane-11-one-21 - oic acid, condensing the latter in the form of its sodium derivative with benzyloxy chloromethane in a mixture of dimethylformamide and toluene to form the di methyl ester of 3α-[2'-tetrahydropyranyloxy]-20-carboxy-20 - benzyloxymethyl-5β-pregnane-11-one-21-oic acid, hydrolysing the latter with hydrochloric acid in methanol to form the dimethyl ester of 20 - carboxy - 20-benzyloxymethyl-5β-pregnane-3α-ol-11-one-21-oic acid, reducing the latter in tetrahydrofuran with lithium aluminum hydride to form 20 - hydroxymethyl-20-benzyloxymethyl-5β-pregnane-3α, 11β,21-triol, subjecting the latter in ethanol to catalytic hydrogenolysis in the presence of palladized carbon black to form 20-bis-(hydroxymethyl)-5β-pregnane-3α,11β,21-triol, esterifying the latter with acetic anhydride in the presence of pyridine to form 3α,21-diacetoxy-20-bis-(acetoxymethyl)-5β-pregnane-11β-ol, oxidizing the latter in aqueous acetone with a sulfuric acid-chromic acid oxidizing agent to form 3α,21-diacetoxy-20-bis-(acetoxymethyl)-5β-pregnane-11-one, saponifying the latter with sodium hydroxide in methanol to form 20-bis-(hydroxymethyl)-5β-pregnane-3α,21-diol-11-one, reacting the latter with ethyl orthoformate in an anhydrous solvent to form 1'-(5β - androstane-3α-ol-11-one-17β-yl)-3',5',8'-trioxabicyclo-(2,2,2,)-octane, reacting the latter with acetic anhydride in the presence of pyridine to form 1'-(3α-acetoxy - 5β-androstane-11-one-17β-yl)-3',5',8'-trioxabicyclo-(2,2,2,)-octane, hydrolyzing the latter with hydrochloric acid in methanol to form 3α-acetoxy-20-bis-(hydroxymethyl)-5β-pregnane-21-ol-11-one and recovering the latter.

9. The ethyl ester of 3α-acetoxy-20-cyano-$\Delta^{17(20)}$-5β-pregnene-11-one-21-oic acid.

10. The ethyl ester of 3α-acetoxy-20-cyano-5β-pregnane-11-one-21-oic acid.

11. 20-carboxy-5β-pregnane-3α-ol-11-one-21-oic acid.

12. The dimethyl ester of 20-carboxy-5β-pregnane-3α-ol-11-one-21-oic acid.

13. The di methyl ester of 3α-[2'-tetrahydropyranyloxy]-20-carboxy-5β-pregnane-11-one-21-oic acid.

14. The di methyl ester of 3α-[2'-tetrahydropyranyloxy] - 20 - carboxy-20-benzyloxymethyl-5β-pregnane-11-one-21-oic acid.

15. The di methyl ester of 20-carboxy-20-benzyloxymethyl-5β-pregnane-3α-ol-11-one-21-oic acid.

16. 20 - hydroxymethyl - 20-benzyloxymethyl-5β-pregnane-3α,11β,21-triol.

17. 20 - bis - (hydroxymethyl)-5β-pregnane-3α,11β,21-triol.

18. 3α,21 - diacetoxy-20-bis-(acetoxymethyl)-5β-pregnane-11β-ol.

19. 3α,21 - diacetoxy-20-bis-(acetoxymethyl)-5β-pregnane-11-one.

20. 1' - [5β-androstane-3α-ol-11-one-17β-yl]-3',5',8'-trioxabicyclo-(2,2,2)-octane.

21. 1' - [3α - acetoxy-5β-androstane-11-one-17β-yl]-3', 5',8'-trioxabicyclo-(2,2,2)-octane.

22. The di methyl ester of 20-carboxy-20-hydroxymethyl-5β-pregnane-3α-ol-11-one-21-oic acid.

No references cited.

UNITED STATES PATENT OFFICE
CERTIFICATE OF CORRECTION

Patent No. 3,079,385                         February 26, 1963

Daniel Bertin et al.

It is hereby certified that error appears in the above numbered patent requiring correction and that the said Letters Patent should read as corrected below.

Column 2, line 36, for "oragnic" read -- organic --; column 5, line 51, for "The" read -- Then --; column 8, line 49, for "$C_{29}O_{44}O_7$" read -- $C_{29}H_{44}O_7$ --; column 9, line 12, "(VII)" read -- (VIII) --; column 13, line 14, for "pyranyloxy)" read -- pyranyloxyl] --; line 24, for "-5-" read -- -5β- --.

Signed and sealed this 22nd day of October 1963.

(SEAL)
Attest:

ERNEST W. SWIDER
Attesting Officer

EDWIN L. REYNOLDS
Acting Commissioner of Patents